(12) United States Patent
Hofmann et al.

(10) Patent No.: US 6,224,751 B1
(45) Date of Patent: May 1, 2001

(54) WATER PURIFYING DEVICE WITH MEANS FOR INDICATING EXHAUSTION OF THE PURIFYING MEDIUM

(75) Inventors: Uwe Hofmann, Heidenrod; Erik Fischer, Glashutten, both of (DE)

(73) Assignee: Brita GmbH, Taunusstein (DE)

( * ) Notice: Subject to any disclaimer, the term of this patent is extended or adjusted under 35 U.S.C. 154(b) by 0 days.

(21) Appl. No.: 09/293,860

(22) Filed: Apr. 16, 1999

(30) Foreign Application Priority Data

Apr. 29, 1998 (DE) .............................................. 198 19 098

(51) Int. Cl.$^7$ .................................................. B01D 27/00
(52) U.S. Cl. ........................... 210/85; 210/232; 210/238; 210/475; 210/482; 210/282; 368/10; 206/459.1; 222/23; 222/189.07
(58) Field of Search ..................... 215/230; 206/459.1, 206/459.5; 210/85, 87, 232, 237, 238, 282, 473–477, 482, 138; 222/23, 30, 36, 638–641, 644, 465.1, 189.06, 189.07; 368/10

(56) References Cited

U.S. PATENT DOCUMENTS

| D. 398,184 | * | 9/1998 | Silverberg et al. . |
| 3,861,565 | * | 1/1975 | Rickmeier, Jr. . |
| 4,895,648 | | 1/1990 | Hankammer . |
| 4,986,901 | | 1/1991 | Nohren, Jr. et al. . |
| 5,190,643 | | 3/1993 | Duncan et al. . |
| 5,457,665 | * | 10/1995 | Reid . |
| 5,900,138 | * | 5/1999 | Moretto . |
| 6,024,867 | * | 2/2000 | Parise . |

FOREIGN PATENT DOCUMENTS

| 0 349 315 | 1/1990 | (EP) . |
| 39 03 955 | 1/1990 | (DE) . |
| 2 269 586 | 2/1994 | (GB) . |
| 95/29131 | 11/1995 | (WO) . |
| 96/13318 | 5/1996 | (WO) . |

* cited by examiner

Primary Examiner—Joseph W. Drodge
Assistant Examiner—Terry K. Cecil
(74) Attorney, Agent, or Firm—Michael L. Dunn

(57) ABSTRACT

A water purifying device that has a collecting jug for purified water, in which a funnel with a filter cartridge filled with purifying medium is fitted in a removable manner, the jug can be closed at the top with a lid. Grips for removing the lid are arranged on the lid, and an indicator is provided for indicating the exhaustion of the purifying medium. The indicator is inexpensive, easily readable and reliably functioning to show the state of exhaustion of the purifying medium. The indicator is secured in an aperture in the top surface of the lid, an indicator panel of which can be seen externally from above and which, by an electronic, battery driven circuit, shows only the respective state of time elapsed, without cooperating with separate signaling.

12 Claims, 4 Drawing Sheets

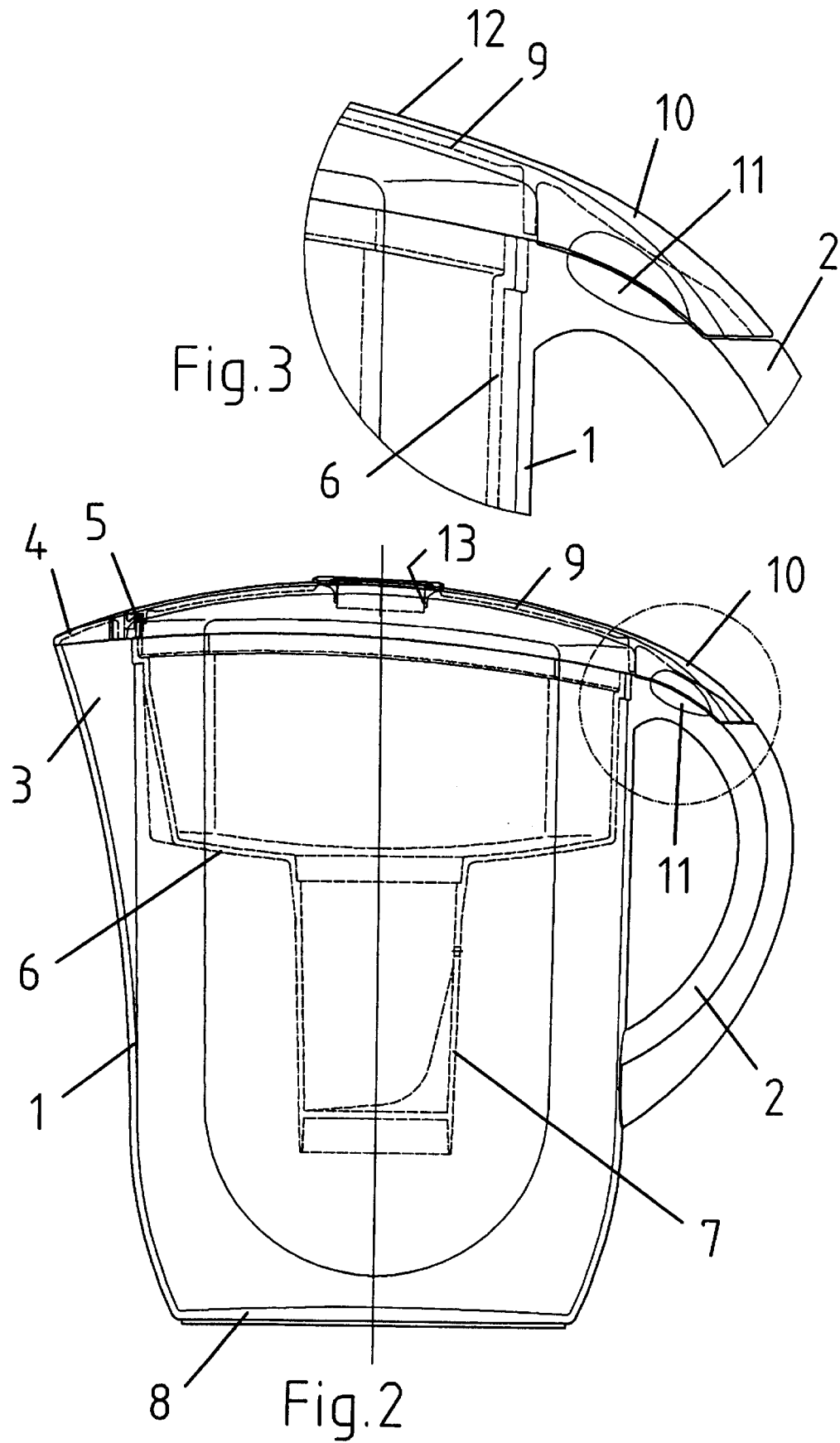

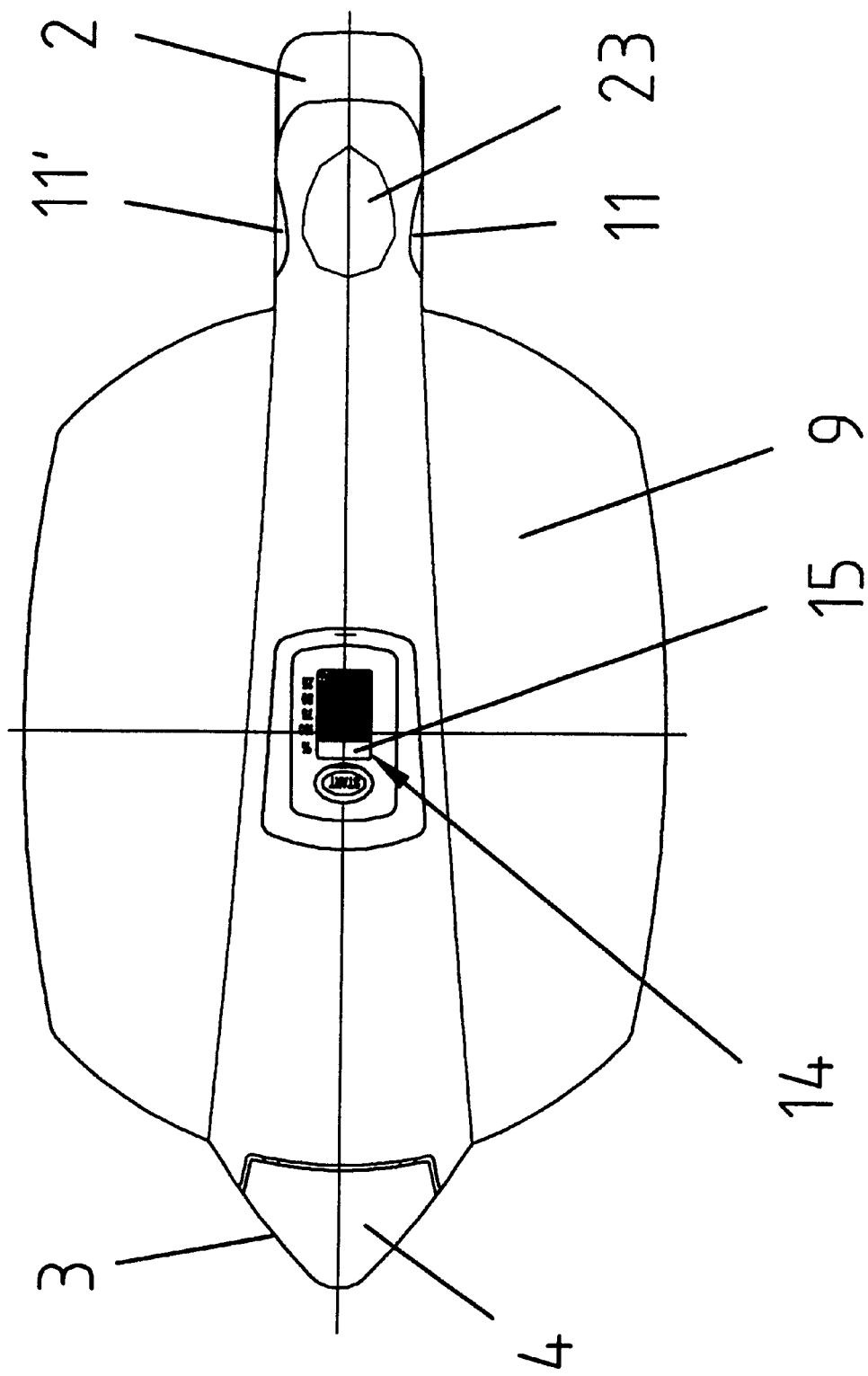

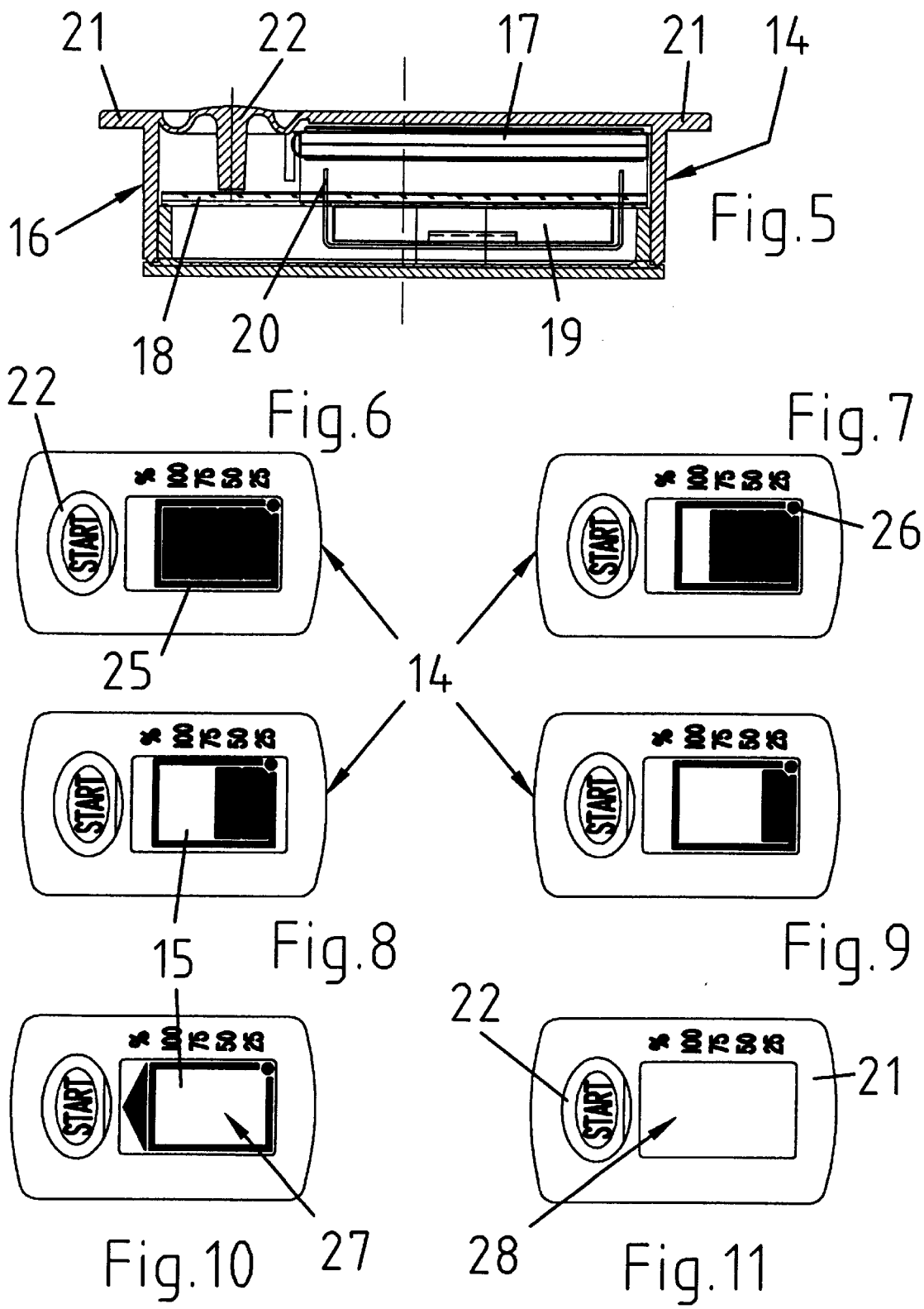

WATER PURIFYING DEVICE WITH MEANS FOR INDICATING EXHAUSTION OF THE PURIFYING MEDIUM

FIELD OF THE INVENTION

The invention relates to a water purifying device with a collecting jug for purified water, in which a funnel with a filter cartridge filled with purifying medium is fitted in a removable manner and which can be closed at the top with a lid, wherein means for removing the lid and means for indicating the exhaustion of the purifying medium are arranged on the lid.

BACKGROUND OF THE INVENTION

A water purifying device of the type described hereinabove is already known from German patent 38 14 683. It is also known from this that often the consumer and user of such a water purifying device does not replace the purifying medium in good time. For example, the ion exchangers often used to have a capacity to purify approximately 60 to 100 litres of water. In a normal household a water purifying device or preparation device of the type described in the introduction can be used perfectly well in a hygienic manner for a period of, for example, one month with one and the same purifying means. For reasons of hygiene, however, the purifying means, for example the ion exchanger or a mixture including it, should not be in use for very much longer than the lifetime indicated. The purifying medium should be replaced thereafter. It would thus be desirable to provide an indication at that time, showing a time reference, and to be able to replace the purifying medium in good time.

With previous filter cartridges, and also those of the type described in the patent described hereinabove, the problem of ventilation was significant, so a cap-like top part was provided by means of which the consumer could, at least in a mechanical way, be given a means for said consumer to recognise when a pre-determined time had elapsed, that is to say when it is expected that the purifying medium in the filter cartridge is exhausted. The top part, configured in a cap-shape, was provided with a perforated plate, wherein each hole was assigned to a month of the year. The consumer can place a pointer, for example a stopper attached to a band, in a specific hole at the beginning of use, in order to later remind himself of the time when, at the latest, the purifying medium in the filter cartridge ought to be exhausted. Disadvantageously, however, it was left to the consumer to place the stopper in one of the many holes. Disadvantageously, the stopper could also be knocked out of the previously correctly specified hole (for example, during use) and then the actual time for replacement of the filter cartridge was not known.

Tests have also already been carried out replacing these mechanical means with electronic indicators. A reed switch was built into an indicator, which switch interacts with a magnet arranged on the rim of the collecting jug or the like to the effect that each time the lid is removed, the magnetic field is interrupted and the reed switch actuated, so a kind of indirect volume measurement, optionally also linked to a time measurement, can provide information about the state of exhaustion of the purifying medium. Disadvantageously, the time remaining until the purifying medium is exhausted is reduced each time the lid is lifted off and put on, that is to say the indicator in this test also counts when movements of the reed switch relative to the magnets take place. Even when the lid is rotated, unintentional counting can result. With this test apparatus, the indicator with the reed switch must also be arranged in operating distance of the magnet. In one embodiment, fixing of the indicator in the edge of the lid was provided.

SUMMARY OF THE INVENTION

In order to be free of these limitations, the object of the invention is to improve the water purifying device of the type described in the introduction to the effect that an inexpensive, easily recognisable and reliably functioning indication of the state of exhaustion of the purifying medium is provided.

In accordance with the invention, this object is solved in that the means for indicating exhaustion is an indicator fitted in an aperture in the surface of the lid, the indicator panel of which can be seen from above from the exterior, and which, by means of an electronic, battery driven circuit, shows only the respective time elapsed, without cooperating with a separate signalling means. Without errors caused by irrelevant movements of the lid with respect to the funnel or the collecting jug, using the novel water purifying device an indication of the state of exhaustion of the purifying medium is provided which is solely time-related. The manufacturer of the purifying medium knows from its composition and the amount or, for example, the degree of hardness of the water, the time period during which the purifying medium in the given filter cartridge has the desired effect. If this is a month, the indicator according to the novel invention then shows one month, for example, divided into a plurality of segments in order to signal to the viewer that a specific and recognisable fraction of this time has elapsed.

Using the electronic circuit in the indicator, with the water purifying device according to the invention, there is no dependence upon mechanical parts and the wear and tear to these, wherein mechanical timers or shifters already exist which count, dependent on the opening of the pourer of the collecting jug, and display the result of this counting. According to the invention this is more easily and inexpensively solved by electronic means. In addition, no signalling means separate from the indicator are needed. The arrangement of the indicator according to the invention is moreover unrestricted.

With many known water purifying devices, a knob is provided on the top surface of the lid, mostly at its centre. This is partly used for ventilation purposes, and partly simply for taking hold of the lid. In the case of a round lid, its centre is particularly logical, easily visible and consequently particularly attractive for the consumer. Many known water purifying devices therefore have the knob in the middle of the lid. An arrangement of a reed switch in the middle of the lid is out of the question with older devices, as the distance from a magnet arranged outside the rim of the collecting jug would be too great.

According to the invention, by omitting separate signalling means such as, for example, magnets, and by representing only the time, the technical limitations described hereinabove can be overcome. According to the invention it is provided that the indicator panel fitted at the top of the indicator is located in the centre of the surface of the lid, and the means for removing the lid from the funnel and/or the collecting jug are arranged in the area of the edge of the lid surface. In this embodiment of the invention, the arrangement of the indicator with its indicator panel in the middle of the surface of the lid is clearly visible and easily understandable for the consumer. Any distance of the indicator from a separate signalling means does not have to be taken into account. In this embodiment, the knob can be omitted as a means for removing the lid as differently configured means are provided at the edge area of the surface of the lid for removing said lid. For example, the surface of the lid above the funnel, or the upper rim of the collecting jug, can be configured so as to project. The consumer can then grip the lid and remove it over the projecting rim. It is also conceivable to have grip handles projecting alternately from the rim which the consumer can also take hold of easily or also find by the sense of touch in order to then remove the lid. On the one hand, these measures provide practical and easy handling of the water purifying device which, on the other hand, also has the indicator panel of the indicator clearly visible in the important central position.

It is furthermore advantageous according to the invention when the means for removing the lid is arranged in the rear area of the lid in the form of gripping recesses on both sides. "Above" and "below" will be mentioned hereinafter. By this it is understood that water to be purified is poured into the funnel from above and runs down below into the collecting jug. To this extent, it is understood that the base of the collecting jug is below and the lid is arranged above. In a preferred embodiment, the collecting jug has a handle at one end, the so-called rear end. Opposite this, that is to say at the front end, a pourer is arranged which is preferably provided with a small covering cap. While the user lifts the collecting jug by the rear handle, purified water flows from the front pourer. When the lid is fitted, it terminates before the pourer, and has a rear area which, in the embodiment with the handle on the rear end of the collecting jug, extends over and above the handle by a certain amount. In this area of the lid, on each side of the part integral with the lid, there is located a gripping recess, which can preferably also continue as far as the handle area. With or without the handle, in each case the consumer can take hold of the rear area of the lid using the two gripping recesses, and by means of these remove the lid from the funnel and/or the collecting jug. By means of this simple configuration of the means for removing the lid, the central area thereof is free for the attachment of the indicator in the manner described hereinabove.

It is furthermore advantageous according to the invention when the indicator provided with an upper external flange is embedded beneath the lid surface such that the indicator panel, adjacent to the external flange, comes to lie approximately flush with the lid surface. This arrangement of the indicator provides an attractive exterior to the whole water purifying device, as the consumer's first look is directed to the surface where the indicator could be described as eye-catching. The lid surface can be more or less large, that is to say the distance from the centre of the lid to any edge area can be as large as is desired. There is no maximum effective size with this embodiment of the invention, as a separate signalling means is not necessary for the signals in the indicator panel.

In a further advantageous embodiment of the invention, a push button is arranged inside the frame-shaped external flange, adjacent to the indicator panel. The whole indicator can be configured so that it is large enough to provide an easily visible indicator panel and also to provide a push button next to it. Using the push button, the operating mode can be changed, or the electronics re-set in a manner known per se. For example, in an embodiment, after a time cycle has elapsed, the indication can be terminated so that the consumer is required to change the filter cartridge, and thereby the purifying medium, and to re-start the counting by pushing the push button. Preferably, the push button is therefore provided with the caption "START".

In accordance with the invention, the state of time elapsed can further be shown by bars, panels or characters visible in the indicator panel, and a flashing indicator can be provided. It is advantageous to represent for the viewer the respective time elapsed at any time in a measurement cycle. In a preferred embodiment this is done by dividing the time into four parts, each of 25%. The whole panel is thereby divided into four sub-panels which appear to the viewer to be present at the beginning of counting; after a quarter of the time, one quarter disappears, until after all the time has elapsed, all four panels have disappeared. A frame surrounding these sub-panels can then flash, and show the viewer that the purifying medium is now exhausted as the time which the purifying medium takes to wear out, with normal usage, has elapsed.

BRIEF DESCRIPTION OF THE DRAWINGS

Further advantages, features and possibilities for application of the present invention will be evident from the following description of a preferred embodiment with reference to the attached drawings. In these is shown, in.

DETAILED DESCRIPTION OF THE DRAWINGS

Figure 1:
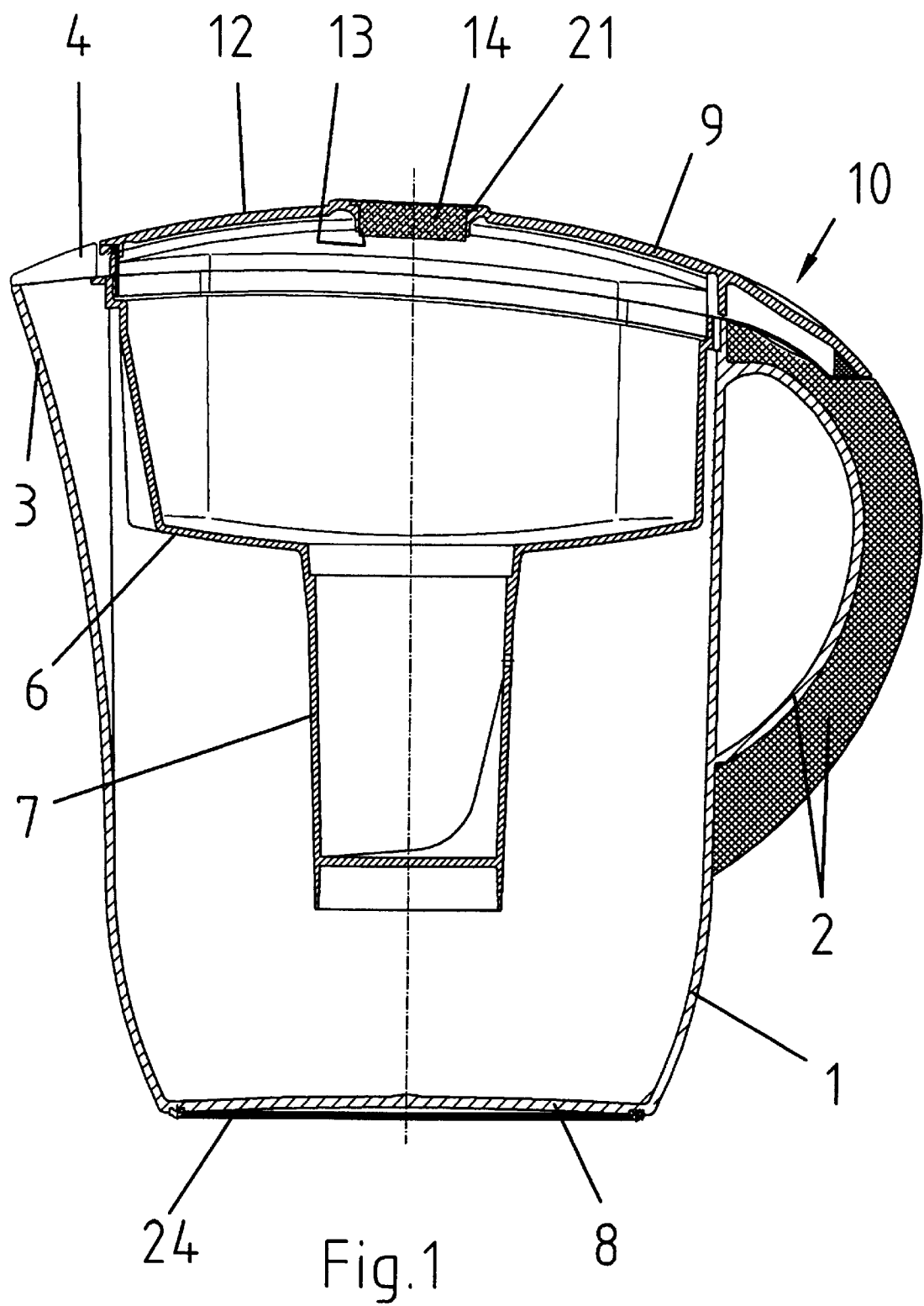
FIG. 1 a cross-section through a water purifying device with the handle at the back and pourer at the front, FIG. 2 a side view of the device of FIG. 1, wherein some invisible edges are shown and recesses for removing the lid are shown in the rear area of the lid inside the circle shown with dashed lines, FIG. 3 an enlarged view of the detail in the circle shown with dashed lines in FIG. 2, FIG. 4 a plan view of the lid, the pourer and the handle of the water purifying device of the Figures described hereinabove, FIG. 5 a cross-section of the indicator in a greatly enlarged scale, FIG. 6 a plan view of the indicator in a first indication condition, FIGS. 7 to 9 the same view as in FIG. 6, wherein, however, a second or third or fourth condition is shown on the indicator panel, FIG. 10 again, the same view as in FIG. 6, wherein, however, another representation is shown, and the inclined arrow shows the flashing light, and FIG. 11 a similar representation as in FIG. 10, wherein all indications are erased and no indication can be seen at the place indicated by the arrow.

The water purifying device shown in FIGS. 1 to 4 is composed of plastics and is provided with a collecting jug 1 with a handle 2 arranged on the rear side. On the front side, opposite the handle 2, there is located the pourer 3 of the collecting jug 1, which is closed by means of a covering cap 4 which is pivotably attached by means of a horizontal hinge 5. If the user lifts the collecting jug 1 by taking hold of the jug using the handle 2, the covering cap 4 then tips up for pouring the water, and afterwards flaps back down again into the closed position.

A funnel 6 is removably fitted into the collecting jug 1 on the upper edge of said collecting jug 1. The funnel 6 narrows downwards into a sleeve 7 into which a filter cartridge, which is not shown, can be removably fitted such that water to be purified, poured from above into the funnel 6, can only pass through the filter cartridge and flow down, where the purified water, after leaving the sleeve 7, is collected over the base 8 of the collecting jug 1.

At the top, that is to say on the side opposite the base 8, the funnel 6 is closed by a lid 9. This clearly leaves the pourer 3 free in the area of the covering cap 4, extending instead towards the opposite, that is to say the rear, side, by a certain amount over the handle 2, so that there, in the handle area, it forms the lid handle area 10. Gripping recesses 11, 11' are located on both sides of this lid handle area. It can be seen from FIGS. 2 and 3 how these gripping recesses 11 also extend as far as the handle 2. The user can, as desired, comfortably lift and remove the lid 9 using these cavity-like gripping recesses 11, 11'. The lid surface 12 has a special surface quality, being, for example, glossy or matt, in order to give the water purifying device as a whole an attractive appearance.

Viewed from above, an indicator 14, the indicator panel 15 of which is clearly recognisable and visible from above, is located in an aperture 13 in the lid surface 12. This indicator panel 15 is shown enlarged in FIGS. 6 to 11. It is formed by the window of a housing 16 with side walls and a base which are welded together in a water-tight manner. The indicator panel 15 is formed by a liquid crystal display 17, LCD. Control thereof is by means of a circuit, of which only the printed circuit board 18, PCB, is shown in FIG. 5. The electrical supply is by means of a battery 19 with the aid of the battery contact 20.

The housing 16 of the indicator 14 is provided at the top with a frame-shaped external flange 21. This surrounds the indicator panel 15, inclusive of the push button 22, and is approximately flush with the lid surface 12, as can best be seen in FIGS. 1 and 2.

In order to provide particularly comfortable handling, a depression 23 is also arranged in the lid handle area 10, for example, for receiving the thumb of the right hand of the user, to keep the lid 9 tightly on the collecting jug 1 when the water purifying device is tipped during pouring. A standing ring 24 made from an elastomer is fitted underneath the base 8 of the collecting jug 1 for the good stability thereof. Furthermore, in the hatched area shown in FIG. 1, the handle 2 is provided with a rubber coating.

In operation, the user is advised to press the "START" push button when the purifying medium in the filter cartridge is used for the first time. The indication visible in FIG. 6 then appears on the indicator panel 15. An outer frame 25 can be seen, with a point 26. The area inside the frame 25 is divided into four parts and signifies that each bar represents a quarter of the total time which may elapse until the purifying medium in the filter cartridge is exhausted. The indication in FIG. 6 therefore shows four panels, signifying that 100% of the time for using the purifying medium is available. If this is four weeks, each bar then represents the period of one week. After one week, the indication according to FIG. 7 appears. One bar is absent, and the viewer sees that 75% of the total time for using the filter cartridge fitted is still available. In order to increase the awareness of the viewer, or in order to reliably show that the electronics and the indicator are operating, the point 26 in the corner of the frame can flash.

After two weeks, the indication according to FIG. 8 appears, and after three weeks, that in FIG. 9.

Only one week of operating time still remains available for the first filter cartridge, so the user should purchase and store new purifying medium in a new filter cartridge. After this last week elapses, the indication according to FIG. 10 appears. The arrow 27 is meant to show that the frame, its roof shaped arrow, shown in FIG. 10, and the point at the top right all flash at the same time. In this way, the user is made aware in an intensive manner, that the filter cartridge must soon be replaced.

Lastly, the indication disappears, according to the illustration in FIG. 11, so that the indicator panel indicated by the arrow 28 contains no representations. The user knows at the latest now that he must no longer use the filter cartridge but instead should replace it with new purifying medium.

What is claimed is:

1. Water purifying device with a collecting jug (1) for purified water, in which a funnel (6) with a filter cartridge filled with purifying medium is fitted in a removable manner, said purifying device being closeable at a top thereof with a lid (9), wherein means (11,11 ') for removing the lid and means (14, 15) for indicating the exhaustion of the purifying medium are arranged on the lid, said means for indicating exhaustion (14, 15) is an indicator (14) securely affixed on the lid, in an aperture in a top surface of the lid (12), an indicator panel (15) of which can be seen externally from above and which, by means of an electronic, battery driven circuit (18), displays only the time remaining before exhaustion of said purifying medium, under normal usage of said water purifying device, said indicator not cooperating with separate signaling means.

2. Water purifying device according to claim 1, wherein the indicator panel (15) on a top of indicator (14) is located in the centre of the top surface of the lid (12), and the means (11, 11') for removing the lid (9) is arranged in an edge area of the top surface of the lid (12).

3. Water purifying device according to claim 2 wherein said time remaining is shown by means of a display (25, 26) visible in the indicator panel (15), and wherein a flashing light is provided.

4. A water purifying device according to claim 1 wherein the means (11, 11') for removing the lid (9) is arranged in a rear lid area (10) in the form of gripping recesses (11, 11') on each side of the lid.

5. Water purifying device according to claim 4 wherein said time remaining is shown by means of a display (25, 26) visible in the indicator panel (15), and wherein a flashing light is provided.

6. Water purifying device according to claim 4 wherein indicator (14), provided with an upper external flange (21), is embedded in the top surface of the lid (12) such that indicator panel (15), adjacent to an external flange (21), lies approximately flush with the top surface of the lid (12).

7. Water purifying device according to claim 6 wherein a push button (22), adjacent to the indicator panel (15), is arranged inside a frame-shaped external flange (21).

8. Water purifying device according to claim 6 wherein said time remaining is shown by means of a display (25, 26) visible in the indicator panel (15), and wherein a flashing light is provided.

9. Water purifying device according to claim 1 wherein indicator (14), provided with an upper external flange (21), is embedded in the top surface of the lid (12) such that indicator panel (15), adjacent to an external flange (21), lies approximately flush with the top surface of the lid (12).

10. Water purifying device according to claim 9 wherein said time remaining is shown by means of a display (25, 26) visible in the indicator panel (15), and wherein a flashing light is provided.

11. Water purifying device according to claim 9 wherein a push button (22), adjacent to the indicator panel (15), is arranged inside a frame-shaped external flange (21).

12. Water purifying device according to claim 11 wherein said time remaining is shown by means of a display (25, 26) visible in the indicator panel (15), and wherein a flashing light is provided.

* * * * *